US00RE43527E

(19) United States
(12) Reissued Patent
Popp

(10) Patent Number: US RE43,527 E
(45) Date of Reissued Patent: Jul. 17, 2012

(54) METHODS, SYSTEMS, AND SOFTWARE PROGRAM FOR VALIDATION AND MONITORING OF PHARMACEUTICAL MANUFACTURING PROCESSES

(75) Inventor: Shane M. Popp, Santa Monica, CA (US)

(73) Assignee: SMP Logic Systems LLC, Los Angeles

(21) Appl. No.: 12/313,804

(22) Filed: Nov. 25, 2008

Related U.S. Patent Documents

Reissue of:
(64) Patent No.: 7,444,197
Issued: Oct. 28, 2008
Appl. No.: 10/840,732
Filed: May 6, 2004

(51) Int. Cl.
*G06F 19/00* (2006.01)

(52) U.S. Cl. ..... 700/110; 700/109; 700/207

(58) Field of Classification Search ..... 700/110, 700/109, 26, 207, 208, 211; 705/1–3, 1.1
See application file for complete search history.

(56) References Cited

U.S. PATENT DOCUMENTS

| | | | |
|---|---|---|---|
| 4,443,861 | A | 4/1984 | Slater |
| 4,558,413 | A | 12/1985 | Schmidt et al. |
| 4,646,229 | A | 2/1987 | Boyle |
| 4,687,662 | A | 8/1987 | Schobel |
| 4,813,013 | A | 3/1989 | Dunn |
| 4,852,047 | A | 7/1989 | Lavallee et al. |
| 4,860,204 | A | 8/1989 | Gendron et al. |
| 4,894,511 | A | 1/1990 | Caledonia et al. |
| 5,006,992 | A | 4/1991 | Skeirik |
| 5,029,179 | A | 7/1991 | Harrison |
| 5,038,138 | A | 8/1991 | Akiyama et al. |
| 5,041,195 | A | 8/1991 | Taylor et al. |
| 5,041,197 | A | 8/1991 | Gelb |
| 5,084,144 | A | 1/1992 | Reddy et al. |
| 5,122,717 | A | 6/1992 | Hayashi |
| 5,132,193 | A | 7/1992 | Reddy et al. |
| 5,133,842 | A | 7/1992 | Taylor et al. |
| 5,134,560 | A | 7/1992 | Ferriter et al. |
| 5,191,534 | A | 3/1993 | Orr et al. |
| 5,235,605 | A | 8/1993 | Rines et al. |
| 5,235,610 | A | 8/1993 | Finch et al. |
| 5,247,693 | A | 9/1993 | Bristol |
| 5,278,979 | A | 1/1994 | Foster et al. |
| 5,301,336 | A | 4/1994 | Kodosky et al. |
| 5,315,530 | A | 5/1994 | Gerhardt et al. |
| 5,325,481 | A | 6/1994 | Hunt |

(Continued)

FOREIGN PATENT DOCUMENTS

| | | | |
|---|---|---|---|
| EP | 0696001 | B1 | 2/1996 |

(Continued)

OTHER PUBLICATIONS

IEEE Standard for Software Safety Plans IEEE Std 1228-1994 pp. i-v and 1-17 (1994).*

(Continued)

*Primary Examiner* — John R. Cottingham
*Assistant Examiner* — Steven Garland

(57) ABSTRACT

Methods, systems, and software program for validation of pharmaceutical manufacturing processes and quality assurance process are described and disclosed herein. Consequently, the methods provide a means to perform validation on an integrated level whereby the quality control unit can ensure data and product integrity and minimize cost.

6 Claims, 3 Drawing Sheets

U.S. PATENT DOCUMENTS

| | | | | |
|---|---|---|---|---|
| 5,333,265 | A | | 7/1994 | Orimo et al. |
| 5,345,457 | A | | 9/1994 | Zenzie et al. |
| 5,358,695 | A | | 10/1994 | Helble et al. |
| 5,367,624 | A | | 11/1994 | Cooper |
| 5,377,003 | A | | 12/1994 | Lewis et al. |
| 5,392,207 | A | | 2/1995 | Wilson et al. |
| 5,447,708 | A | | 9/1995 | Helble et al. |
| 5,461,477 | A | | 10/1995 | Marinelli et al. |
| 5,528,368 | A | | 6/1996 | Lewis et al. |
| 5,532,928 | A | | 7/1996 | Stanczyk et al. |
| 5,548,535 | A | | 8/1996 | Zvonar |
| 5,552,412 | A | | 9/1996 | Cameron et al. |
| 5,556,447 | A | | 9/1996 | Srinivasachar et al. |
| 5,565,073 | A | | 10/1996 | Fraser et al. |
| 5,576,946 | A | | 11/1996 | Bender et al. |
| 5,586,313 | A | | 12/1996 | Schnittker et al. |
| 5,603,894 | A | * | 2/1997 | Aikus et al. ..... 422/23 |
| 5,647,968 | A | | 7/1997 | Fraser et al. |
| 5,652,911 | A | | 7/1997 | Van Venrooy et al. |
| 5,664,112 | A | | 9/1997 | Sturgeon et al. |
| 5,712,990 | A | | 1/1998 | Henderson |
| 5,726,984 | A | | 3/1998 | Kubler et al. |
| 5,732,397 | A | | 3/1998 | DeTore et al. |
| 5,734,026 | A | | 3/1998 | Florin-Robertsson et al. |
| 5,734,380 | A | | 3/1998 | Adams et al. |
| 5,740,190 | A | | 4/1998 | Moulton |
| 5,767,941 | A | | 6/1998 | Ferguson |
| 5,774,489 | A | | 6/1998 | Moulton et al. |
| 5,774,875 | A | | 6/1998 | Medeiros et al. |
| 5,787,000 | A | | 7/1998 | Lilly et al. |
| 5,793,013 | A | | 8/1998 | Read et al. |
| 5,796,403 | A | | 8/1998 | Adams et al. |
| 5,831,859 | A | | 11/1998 | Medeiros et al. |
| 5,832,449 | A | | 11/1998 | Cunningham |
| 5,835,922 | A | | 11/1998 | Shima et al. |
| 5,847,957 | A | | 12/1998 | Cohen et al. |
| 5,860,020 | A | | 1/1999 | Van Venrooy et al. |
| 5,864,483 | A | | 1/1999 | Brichta |
| 5,892,947 | A | | 4/1999 | DeLong et al. |
| 5,901,879 | A | * | 5/1999 | Duhaime et al. ..... 222/1 |
| 5,953,688 | A | | 9/1999 | Su et al. |
| 5,956,938 | A | | 9/1999 | Brandenburg |
| 5,970,503 | A | | 10/1999 | Eisenberg |
| 5,997,155 | A | | 12/1999 | Ducharme et al. |
| 5,997,361 | A | | 12/1999 | Driscoll et al. |
| 6,025,769 | A | | 2/2000 | Chu et al. |
| 6,034,768 | A | | 3/2000 | Fraser et al. |
| 6,049,742 | A | | 4/2000 | Milne et al. |
| 6,055,507 | A | | 4/2000 | Cunningham |
| 6,067,549 | A | | 5/2000 | Smalley et al. |
| 6,083,281 | A | | 7/2000 | Diec et al. |
| 6,106,274 | A | | 8/2000 | Ritchie et al. |
| 6,112,130 | A | | 8/2000 | Fukuda et al. |
| 6,122,622 | A | | 9/2000 | Wiitala et al. |
| 6,123,964 | A | | 9/2000 | Asgharnejad et al. |
| 6,141,647 | A | | 10/2000 | Meijer et al. |
| 6,169,928 | B1 | | 1/2001 | Olson et al. |
| 6,215,898 | B1 | | 4/2001 | Woodfill et al. |
| 6,223,343 | B1 | | 4/2001 | Hopwood et al. |
| 6,226,369 | B1 | | 5/2001 | Lim et al. |
| 6,235,938 | B1 | | 5/2001 | Hartwig et al. |
| 6,243,615 | B1 | | 6/2001 | Neway et al. |
| 6,256,640 | B1 | | 7/2001 | Smalley et al. |
| 6,263,438 | B1 | | 7/2001 | Walker et al. |
| 6,272,506 | B1 | | 8/2001 | Bell |
| 6,279,026 | B1 | | 8/2001 | Clarke et al. |
| 6,324,522 | B2 | | 11/2001 | Peterson et al. |
| 6,347,533 | B1 | | 2/2002 | Tung |
| 6,370,422 | B1 | | 4/2002 | Richards-Kortum et al. |
| 6,385,768 | B1 | | 5/2002 | Ziebell |
| 6,393,458 | B1 | | 5/2002 | Gigliotta et al. |
| 6,397,115 | B1 | | 5/2002 | Basden |
| 6,419,953 | B1 | | 7/2002 | Qiu et al. |
| 6,441,552 | B1 | | 8/2002 | Brandenburg et al. |
| 6,446,136 | B1 | | 9/2002 | Pohlmann et al. |
| 6,456,737 | B1 | | 9/2002 | Woodfill et al. |
| 6,470,227 | B1 | | 10/2002 | Rangachari et al. |
| 6,483,112 | B1 | | 11/2002 | Lewis |
| 6,501,869 | B1 | | 12/2002 | Athale |
| 6,505,085 | B1 | | 1/2003 | Tuttle et al. |
| 6,509,145 | B1 | | 1/2003 | Torrianni |
| 6,567,788 | B1 | | 5/2003 | Johnson |
| 6,581,020 | B1 | | 6/2003 | Buote et al. |
| 6,606,524 | B1 | | 8/2003 | Byun et al. |
| 6,631,630 | B1 | | 10/2003 | Pourboghrat et al. |
| 6,645,529 | B2 | | 11/2003 | Gergely et al. |
| 6,687,558 | B2 | | 2/2004 | Tuszynski |
| 6,687,887 | B1 | | 2/2004 | Teig et al. |
| 6,690,464 | B1 | | 2/2004 | Lewis et al. |
| 6,691,070 | B1 | | 2/2004 | Williams et al. |
| 6,692,764 | B2 | | 2/2004 | Katdare et al. |
| 6,697,783 | B1 | | 2/2004 | Brinkman et al. |
| 6,707,122 | B1 | | 3/2004 | Hines et al. |
| 6,718,291 | B1 | | 4/2004 | Shapiro et al. |
| 6,732,019 | B2 | | 5/2004 | Spool et al. |
| 6,735,748 | B1 | | 5/2004 | Teig et al. |
| 6,738,450 | B1 | | 5/2004 | Barford |
| 6,776,486 | B2 | | 8/2004 | Steele et al. |
| 6,778,882 | B2 | | 8/2004 | Spool et al. |
| 6,816,793 | B2 | | 11/2004 | Chow et al. |
| 6,850,809 | B1 | | 2/2005 | Callar et al. |
| 6,852,219 | B2 | | 2/2005 | Hammond |
| 6,857,112 | B1 | | 2/2005 | Teig et al. |
| 6,862,488 | B2 | | 3/2005 | Mansour-Awad |
| 6,865,508 | B2 | | 3/2005 | Ueki et al. |
| 6,883,148 | B1 | | 4/2005 | Teig et al. |
| 6,892,366 | B1 | | 5/2005 | Teig et al. |
| 6,904,370 | B1 | | 6/2005 | Levinson et al. |
| 6,907,591 | B1 | | 6/2005 | Teig et al. |
| 6,944,512 | B2 | | 9/2005 | Breimesser et al. |
| 6,944,662 | B2 | | 9/2005 | Devine et al. |
| 6,965,895 | B2 | | 11/2005 | Smith et al. |
| 6,966,235 | B1 | | 11/2005 | Paton |
| 6,968,292 | B2 | | 11/2005 | Boyer |
| 6,977,385 | B2 | | 12/2005 | Struye et al. |
| 6,979,578 | B2 | | 12/2005 | Venugopal |
| 6,980,852 | B2 | | 12/2005 | Jersey-Willuhn et al. |
| 7,006,882 | B2 | | 2/2006 | Chang et al. |
| 7,020,876 | B1 | | 3/2006 | Deitz et al. |
| 7,027,883 | B2 | | 4/2006 | Shen |
| 7,031,784 | B1 | | 4/2006 | Lai et al. |
| 7,033,023 | B2 | | 4/2006 | Steele et al. |
| 7,050,875 | B2 | | 5/2006 | Cribbs et al. |
| 7,051,293 | B1 | | 5/2006 | Teig et al. |
| 7,069,101 | B1 | | 6/2006 | Arackaparambil et al. |
| 7,079,912 | B2 | | 7/2006 | Stack et al. |
| 7,089,072 | B2 | | 8/2006 | Chia |
| 7,103,524 | B1 | | 9/2006 | Teig et al. |
| 7,112,351 | B2 | | 9/2006 | Affinito |
| 7,113,845 | B1 | | 9/2006 | Behm et al. |
| 7,123,974 | B1 | | 10/2006 | Hamilton |
| 7,127,330 | B2 | | 10/2006 | Spool et al. |
| 7,133,727 | B2 | | 11/2006 | Van Dyk et al. |
| 7,162,534 | B2 | | 1/2007 | Schleiss et al. |
| 7,169,107 | B2 | | 1/2007 | Jersey-Willuhn et al. |
| 7,174,230 | B2 | | 2/2007 | Arackaparambil et al. |
| 7,174,353 | B2 | | 2/2007 | Friske et al. |
| 7,184,820 | B2 | | 2/2007 | Jersey-Willuhn et al. |
| 7,184,964 | B2 | | 2/2007 | Wang |
| 7,187,992 | B2 | | 3/2007 | Tuszynski |
| 7,197,405 | B1 | | 3/2007 | Pruett et al. |
| 7,207,505 | B2 | | 4/2007 | Bender et al. |
| 7,216,007 | B2 | | 5/2007 | Johnson |
| 7,216,084 | B2 | | 5/2007 | Brinkman et al. |
| 7,231,398 | B2 | | 6/2007 | Schlereth et al. |
| 7,233,830 | B1 | | 6/2007 | Callaghan et al. |
| 7,240,119 | B2 | | 7/2007 | Ascoli et al. |
| 7,249,356 | B1 | | 7/2007 | Wilson et al. |
| 7,257,501 | B2 | | 8/2007 | Zhan et al. |
| 7,269,640 | B2 | | 9/2007 | Huntley, Jr. et al. |
| 7,280,893 | B2 | | 10/2007 | Spool et al. |
| 7,299,102 | B2 | | 11/2007 | Ouchi |
| 7,302,307 | B1 | | 11/2007 | Anderson et al. |
| 7,305,278 | B2 | | 12/2007 | Enright et al. |
| 7,317,959 | B2 | | 1/2008 | Pfander et al. |
| 7,322,048 | B2 | | 1/2008 | Nortung |
| 7,343,605 | B2 | | 3/2008 | Langkafel et al. |

7,347,613 B2 3/2008 Ditzig et al.
7,359,760 B2 4/2008 Kishi et al.
7,367,242 B2 5/2008 Xi et al.
2001/0042068 A1 11/2001 Yoshida et al.
2001/0054032 A1 12/2001 Goldman et al.
2002/0011852 A1 1/2002 Mandelis et al.
2002/0015176 A1 2/2002 Takao et al.
2002/0042762 A1 4/2002 McQuade et al.
2002/0044128 A1 4/2002 Hayashi et al.
2002/0046290 A1 4/2002 Andersson et al.
2002/0113151 A1 8/2002 Forber Jones et al.
2002/0116083 A1 8/2002 Schulze
2002/0128886 A1 9/2002 Wang
2002/0138510 A1 9/2002 Tan
2002/0147569 A1 10/2002 Lay et al.
2002/0156548 A1 10/2002 Arackaparambil et al.
2002/0165806 A1 11/2002 Kataria et al.
2002/0187137 A1 12/2002 Bates et al.
2002/0198964 A1 12/2002 Fukazawa et al.
2003/0018400 A1 1/2003 Tuttle et al.
2003/0040844 A1 2/2003 Spool et al.
2003/0040845 A1 2/2003 Spool et al.
2003/0041016 A1 2/2003 Spool et al.
2003/0041017 A1 2/2003 Spool et al.
2003/0041037 A1 2/2003 Spool et al.
2003/0041038 A1 2/2003 Spool et al.
2003/0041039 A1 2/2003 Spool et al.
2003/0046252 A1 3/2003 Spool et al.
2003/0069795 A1 4/2003 Boyd et al.
2003/0069894 A1 4/2003 Cotter et al.
2003/0074223 A1 4/2003 Hickle
2003/0125904 A1 7/2003 Ueki et al.
2003/0139939 A1 7/2003 Spool et al.
2003/0149501 A1 8/2003 Tuszynski
2003/0149608 A1 8/2003 Kall et al.
2003/0149717 A1 8/2003 Heinzman
2003/0150909 A1 8/2003 Markham et al.
2003/0154144 A1 8/2003 Pokorny et al.
2003/0172371 A1 9/2003 Offenmuller
2003/0176981 A1 9/2003 Chow et al.
2003/0180957 A1 9/2003 Koopmann et al.
2003/0183777 A1 10/2003 Struye et al.
2003/0200130 A1 10/2003 Kall et al.
2003/0207795 A1 11/2003 Pilon et al.
2003/0216630 A1 11/2003 Jersey-Willuhn et al.
2003/0216662 A1 11/2003 Jersey-Willuhn et al.
2003/0216663 A1 11/2003 Jersey-Willuhn et al.
2003/0223033 A1 12/2003 Steele et al.
2003/0225124 A1 12/2003 Spireas
2004/0006486 A1* 1/2004 Schmidt et al. ..... 705/1
2004/0011288 A1 1/2004 Affinito
2004/0015521 A1 1/2004 Hudicka
2004/0032592 A1 2/2004 Venugopal et al.
2004/0032593 A1 2/2004 Venugopal
2004/0034543 A1 2/2004 Bartsch
2004/0068454 A1 4/2004 Jacobus et al.
2004/0068455 A1 4/2004 Jacobus et al.
2004/0077075 A1 4/2004 Jensen et al.
2004/0078732 A1 4/2004 Meaney
2004/0107415 A1 6/2004 Melamed et al.
2004/0117126 A1 6/2004 Fetterman et al.
2004/0123864 A1* 7/2004 Hickey et al. ..... 128/203.12
2004/0153171 A1 8/2004 Brandt et al.
2004/0158475 A1 8/2004 Juzeszyn et al.
2004/0167648 A1 8/2004 Tuszynski
2004/0177055 A1 9/2004 Heidemann et al.
2004/0186648 A1 9/2004 Zheng et al.
2004/0204972 A1 10/2004 Anant et al.
2004/0205406 A1 10/2004 Kaliappan et al.
2004/0243260 A1 12/2004 Law et al.
2005/0012895 A1 1/2005 Steele et al.
2005/0015166 A1 1/2005 Kataria et al.
2005/0015741 A1 1/2005 Langkafel et al.
2005/0033468 A1 2/2005 Pate et al.
2005/0033977 A1 2/2005 Zurita et al.
2005/0038565 A1 2/2005 Power et al.
2005/0055110 A1 3/2005 Tuszynski
2005/0065818 A1 3/2005 Brinkman et al.
2005/0106355 A1 5/2005 Kohlman et al.
2005/0107895 A1 5/2005 Pistikopoulos et al.
2005/0137735 A1 6/2005 Loy et al.
2005/0197786 A1 9/2005 Kataria et al.
2005/0251276 A1 11/2005 Shen
2005/0267611 A1 12/2005 Ishigaki
2005/0278052 A1 12/2005 Bett et al.
2005/0288979 A1 12/2005 Guest
2006/0000470 A1 1/2006 Clarke et al.
2006/0002986 A1 1/2006 Clarke et al.
2006/0010426 A1 1/2006 Lewis et al.
2006/0013473 A1 1/2006 Woodfill et al.
2006/0015536 A1 1/2006 Buchanan et al.
2006/0016830 A1 1/2006 Clarke et al.
2006/0017916 A1 1/2006 Clarke et al.
2006/0020578 A1 1/2006 Hood
2006/0026193 A1 2/2006 Hood
2006/0035395 A1 2/2006 Venugopal
2006/0047453 A1 3/2006 Reeve et al.
2006/0047705 A1 3/2006 Reade et al.
2006/0056732 A1 3/2006 Holmes
2006/0064182 A1 3/2006 Ford, Jr. et al.
2006/0070014 A1 3/2006 Liu et al.
2006/0074522 A1 4/2006 Liang et al.
2006/0074917 A1 4/2006 Chand et al.
2006/0089739 A1 4/2006 Sherriff et al.
2006/0095545 A1 5/2006 Dreyer et al.
2006/0100786 A1 5/2006 Choi
2006/0124443 A1 6/2006 Tuschel et al.
2006/0129259 A1 6/2006 Tornquist et al.
2006/0129265 A1 6/2006 Ouchi
2006/0149407 A1 7/2006 Markham et al.
2006/0155410 A1 7/2006 Yamartino
2006/0167579 A1 7/2006 Fujii et al.
2006/0184264 A1 8/2006 Willis et al.
2006/0199260 A1 9/2006 Zhang et al.
2006/0206368 A1 9/2006 Bamberger et al.
2006/0208191 A1 9/2006 Kessler et al.
2006/0214948 A1 9/2006 Murthy
2006/0239116 A1 10/2006 Ditzig et al.
2006/0259500 A1 11/2006 Hood et al.
2006/0267852 A1 11/2006 Ahn et al.
2006/0282223 A1 12/2006 Lewis et al.
2007/0005307 A1 1/2007 Sato
2007/0011227 A1 1/2007 Johnson
2007/0011415 A1 1/2007 Kaakani et al.
2007/0011660 A1 1/2007 Garyali et al.
2007/0016542 A1 1/2007 Rosauer et al.
2007/0037570 A1 2/2007 Donovan et al.
2007/0049267 A1 3/2007 Kota et al.
2007/0050070 A1 3/2007 Strain et al.
2007/0061166 A1 3/2007 Ramasubramanian et al.
2007/0067458 A1 3/2007 Chand
2007/0088534 A1 4/2007 MacArthur et al.
2007/0100471 A1 5/2007 Kumar et al.
2007/0100472 A1 5/2007 Johnson et al.
2007/0100894 A1 5/2007 Manninen et al.
2007/0101091 A1 5/2007 Kaakani et al.
2007/0104949 A1 5/2007 Bunge
2007/0112442 A1 5/2007 Zhan et al.
2007/0112531 A1 5/2007 Zhan et al.
2007/0113051 A1 5/2007 Salpakari
2007/0136667 A1 6/2007 Gerhart et al.
2007/0142941 A1 6/2007 McGreevy et al.
2007/0144240 A1 6/2007 Andle
2007/0149586 A1 6/2007 Giordani et al.
2007/0200781 A1 8/2007 Ahn et al.
2007/0214520 A1 9/2007 Scheibel et al.
2007/0239367 A1 10/2007 Odegard et al.
2008/0009959 A1 1/2008 Enright et al.
2008/0066019 A1 3/2008 Worek et al.
2008/0077617 A1 3/2008 Schulz et al.

FOREIGN PATENT DOCUMENTS

EP 0700680 B1 11/1999
EP 0999506 5/2000
EP 0999506 A1 10/2000
EP 1117007 A2 7/2001
EP 1136951 A2 9/2001
EP 0593114 B1 2/2002

| | | | |
|---|---|---|---|
| EP | 1349177 | A2 | 10/2003 |
| EP | 0503521 | B2 | 11/2005 |
| EP | 1481294 | B1 | 10/2006 |
| EP | 1714695 | A1 | 10/2006 |
| EP | 1830386 | A2 | 5/2007 |
| EP | 1798814 | A2 | 6/2007 |
| WO | WO 97/16434 | A1 | 5/1997 |
| WO | WO 01/15705 | A1 | 3/2001 |
| WO | WO 02/16924 | A1 | 2/2002 |
| WO | WO 02/087546 | A2 | 11/2002 |
| WO | WO 03/058533 | A1 | 7/2003 |
| WO | WO03/063680 | A2 | 8/2003 |
| WO | WO2004/059531 | A1 | 7/2004 |
| WO | WO 2004/072868 | A1 | 8/2004 |
| WO | WO2004/107087 | A2 | 12/2004 |
| WO | WO 2005/038821 | A2 | 4/2005 |
| WO | WO2005/114138 | A2 | 12/2005 |
| WO | WO2006/017808 | A2 | 2/2006 |
| WO | WO 2006/069797 | A1 | 7/2006 |
| WO | WO2006/071808 | A2 | 7/2006 |
| WO | WO 2006/071808 | A2 | 7/2006 |
| WO | WO2006/113450 | A1 | 10/2006 |
| WO | WO 2007/017552 | A1 | 2/2007 |
| WO | WO2007/017738 | A2 | 2/2007 |
| WO | WO 2007/050013 | A1 | 5/2007 |
| WO | WO2007/064624 | A1 | 6/2007 |

OTHER PUBLICATIONS

Guidance for Industry 21 CFR Part 11 Electronic Records, Electronic Signatures Validation Draft Guidance, US Department of Health and Human Services, Aug. 2001, pp. 1-24.
General Principles of Software Validation; Final Guidance for Industry and FDA Staff, pp. i-iv, pp. 1-47, Jan. 11, 2002.
Guide to Inspection of Computerized Systems in Drug Processing, National Center for Drugs and Biologics, et. al. pp. 1-27, Feb. 1983.
The Interoduction of Process Analytical Technology, Using Near Infrared Analysis, to a Pharmaceutical Blending Process, Naicker, et. al., Mar. 6, 2007.
Quality Management System (QMS) for Active Pharmaceutical Ingredient (API) Manufacturers, Inegrating GPM (ICH Q7a) into ISO (9001:2000), pp. 1-73, Sep. 2005.
There is no Execution without Integration, MES Adoption drives performance, pp. 1-21, The Aberdeen Group, Mar. 2007.
The Effect of Shear Mixing on the Blending of Cohesive Lubricants and Drugs, Llusa, et. al., Pharma. Tech., pp. 1-7, Dec. 1, 2005.
Guidance for Management of Computers and Software in Laboratories with Reference to ISO/IEC 17025/2005, EuroLab Technical Report, pp. 1-31, Oct. 2006.
Nondestructive and On-Line Monitoring of Tablets Using Light-Induced Flourescence Technology, Lai, et. al., AAPS PharmaSciTech 2004; 5(1) Article 3.
SAX: Solution Atomization and SonoXrystallization; Technology for Manufacture of Micro and Nanocrystalline Drug Particles, Ruecroft, et. al., pp. 1-27 (2006).
Effects of Average Signed Area Between Two Item Characteristic Curves and Test Purification Procedures on the DIF Detection via the Mantel-Haenszel Method, Wang, et. al., 2004.
Efficiency of the Mantel . . . and Logistic Discriminant Function Analysis Methods in Detecting Differential Item Functioning for Polytomous Items, Su, et. al., 18(4) 313-350 2005.
A Model for Integrating Material Management in a Production Environment, Ham, et. al., Paper No. AUTOW-P109, pp. 1-9, May 3, 2004.
Near-Infrared Spectroscopy and Imaging: Basic Principles and Pharmaceutical Applications, Reich, Adv. Drug Delivery Rev. 57 (2005) pp. 1109-1143.
Small Changes, Big Effects in Biological Manufacturing, Bush, Pharma. Sci. & Tech. News, Nov. 2004, pp. 16-18.
The Role of PAT in Developing New Products, Kraunsoe, APACT Presentation, Apr. 20, 2005, pp. 1-28.
Fit Indices Versus Test Statistics, Yuan, Multivariate Behavioral Research, 40 (1), 115-148 (2005).
Using Cycle Time Analysis to Enhance Operations and Improve Yield, Dream, Pharm. Eng. Sep./Oct. 2006, pp. 1-6.
Standard for Software Component Testing, BCS SIGIST, Draft Apr. 27, 2001, pp. 1-67.
Software Testing: Advanced Level Syllabus, ISTQB, Sep. 2003, pp. 1-42.
Terahertz Sources and Detectors and Thier Application to Biological Sensing, Crowe, et. al., Phil. Trans. R. Soc. Lond. A (2004) 362, 365-377 (online Dec. 16, 2003).
Validation and Compliance; Software Systems Prepare Manufacturers for Com(PAT)ibility, Rios, Pharma. Tech., May 2004, pp. 1-8.
Use of Impedence Methods in Pharmaceutical Methods, Moldenhauer, Rapid Micro. Newsletter, Jul./Aug. 2003 vol. 2 Issue 3 pp. 1-6.
Process Analytical Technology; Concepts and Principles, Balboni, Pharma. Tech. Oct. 2003, pp. 1-6.
Optical, Tunable Filter-Based micro-Instrumentation for Indusrial Applications, Kotidis, et. al. Oct. 20, 2003, pp. 1-14.
Opening the PAT Toolbox, Folestad, et. al., Eur. Pharma. Rev. (2003) vol. 8; Part 4, pp. 36-42.
The Effects of Physical Parameters on LIBS Analysis of Intact Tablets, Archambault, et. al., AAPS Pharma. Sci. Tech., pp. 1-39, Apr. 19, 2005.
Quantitative Analysis of Film Coating in a Pan Coater Based on In-Line Sensor Measurements, Perez-Ramos, et. al.. AAPS Pharma. Sci. Tech. Feb. 2, 2005, pp. 1-40.
Process Analytical Technology Case Study, Part I: Feasibility Studies for Quantitative NIR Method Development, Cogdill, et. al., AAPS Pharm. Sci. Tech. Feb. 2, 2004.
Process Analytical Technology Case Study, Part II: Development and Validation of Quantitative Near Infrared Calibrations . . . Cogdill, et. al., AAPS PharsSciTech. Apr. 19, 2005.
Process Analytical Technology (PAT) and Scable Automation for Bioprocess Control and Monitoring—A Case Study, Ganguly, et. al., Pharm. Eng. Jan./Feb. 2006 pp. 1-9.
Process Analytical Technology Outsourcing—Impacts on Manufacturing and Process Knowledge, Radspinner, et. al. GOR vol. 7, No. 4 pp. 55-58 Winter 2005.
Real-Time On-Line Monitoring of Fluid Bed Dryers Using NIR Spectroscopy, Das, et. al. May 16, 2005.
Whitepaper, Emerson Process Management Manufacturing Execution Systems Capabilities, Mar. 2007, pp. 1-27.
System Validation with Experion PKS, Whitepaper Honeywell, Sep. 13, 2002, pp. 1-19.
Trends in Integrated Manufacturing, Supplement of BioProcess Internation, Sep. 2004, pp. 1-39.
Elastic-Plastic Behavior and Limit Load Analysis of Pipe Bends Under Out-Of-Plane Moment Loading and Internal Pressure, Mourad, Univ. of Cairo, Dec. 1999, pp. 1-188.
Fundamental Modeling and Simulation of Pharmaceutical Powder Blending, Ngai, May 27, 2003, pp. 1-21.
Compliant Manufacturing with SAP in the Pharmaceutical Industry, Sabogal, et. al., Pharm. Ind. 66, Nr. 11a 1405-1412 (2004).
Challenges and Issues in Veterinary Pharmacology and Animal Health 2004—Preface, Martinez, et. al. AAPS Journal 2005; 7(2) Art. 26, pp. 266-271.
Acoustic-Resonance Spectrometry as a Process Analytical Technology for Rapid and Accurate Tablet Identification, Medendorp, et. al. AAPS Pharm. Sci. Tech 2006; 7(1) Art 25.
In-Line Process Analysis of Residual Moisture in a Fluid Bed Granulator—Dryer using NIR Spectroscopy, Mattes, et. al. Spectroscopy, Jan. 2005.
Experimental Designs at the Crossroads of Drug Discovery, Olsen, Umea university (2006), pp. 1-80.
In-Situ Studies of Sulfamerazine and Carbamazepine Crystallization, Rivera, Univ. of Puerto Rico Thesis (2005) pp. 1-82.
Guidance for Industry; PAT—A Framework for Innovative Pharmaceutical Development, Manufacturing, and Quality Assurance, Sep. 2004 pp. 1-19.
Guidance for Industry, FDA Reviewers and Compliance Guide on: Off-the-Shelf Software Use in Medical Devices, U.S. DHHS, Sep. 9, 1999, pp. 1-26.
Compliance Information on 21 C.F.R Part 11; Rockwell Automation Whitepaper, Jan. 2001, pp. 1-29.

Streamlined Recipe Rollout: Application Profile, Rockwell Automation, Mar. 2001, pp. 1-4.
NIST—Software Error Analysis; NIST Special Publication 500-209, Peng, et. al., Mar. 1993, pp. 1-103.
Process Control System Just the Right Prescription: Application Profile, Rockwell Automation, Mar. 2001, pp. 1-4.
International Conference on Harmonisation of Technical Requirements for Registration of Pharmaceuticals for Human Use; Q9: Quality Risk Management, Nov. 11, 2003, pp. 1-3.
Safety Software Quality Assurance Functional Area Qualification Standard, Department of Energy, pp. 1-23, Dec. 2003.
Identification, Integration and Tracking Software System Safety Requirements, Russo, et. al., pp. 1-14, Aug. 1994.
Safety-Critical Software: Status Report and Annotated Biography; Technical Report, Place, et. al., pp. 1-90, Jun. 1993.
Glossary of Computerized System and Software Development Terminology, pp. 1-39, Aug. 1995.
Software System Safety Guide, Russo, pp. 1-41, May 1992.
Council for Education in Pharmaceutical Medicine, IFAPP, pp. 1-9, Oct. 8, 2003.
International Conference on Harmonisation of Technical Requirements for Registration of Pharmaceuticals for Human Use; Q8: Pharmaceutical Development, pp. 1-4, Oct. 8, 2003.
Stable Isotopes Provide a New PAT Tool, Jasper, et. al., Pharm. Mfg. 4(5): 28-33 (May 2005).
Global Manufacturing: MES and Beyond Benchmark Report, Aberdeen Group, pp. 1-27 (May 2006).
Analyzing Software Errors in Safety-Critical Embedded Systems, Lutz, pp. 1-22 (Feb. 24, 1994).
Guidance For Industry 21 CFR Part 11: Electronic Records; Electronic Signatures Validations Draft Guidance U.S. Department of Health andn Human Services, Aug. 2001 pp. 1-21.*
U.S. Department of Health and Human Services, Off-the-shelf software use in Medical devices, Sep. 9, 1999.
General Principles of Software Validation; Final Guidance for Industry and FDA Staff; pp. i-iv, 1-43, Jan. 11, 2002.

* cited by examiner

Figure 1: Schematic of Analysis Method
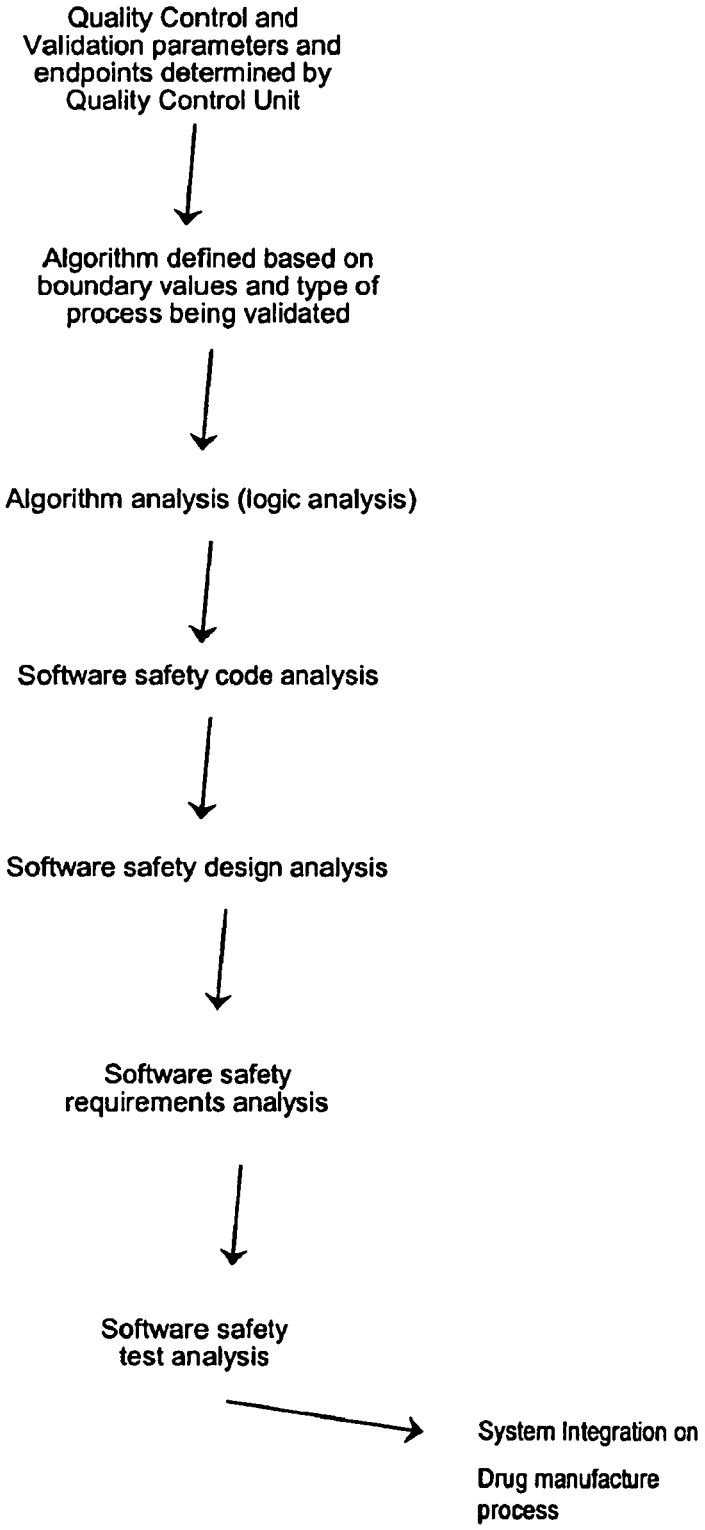

Figure 2. Standard Hazard Analysis and Mitigation Flowchart
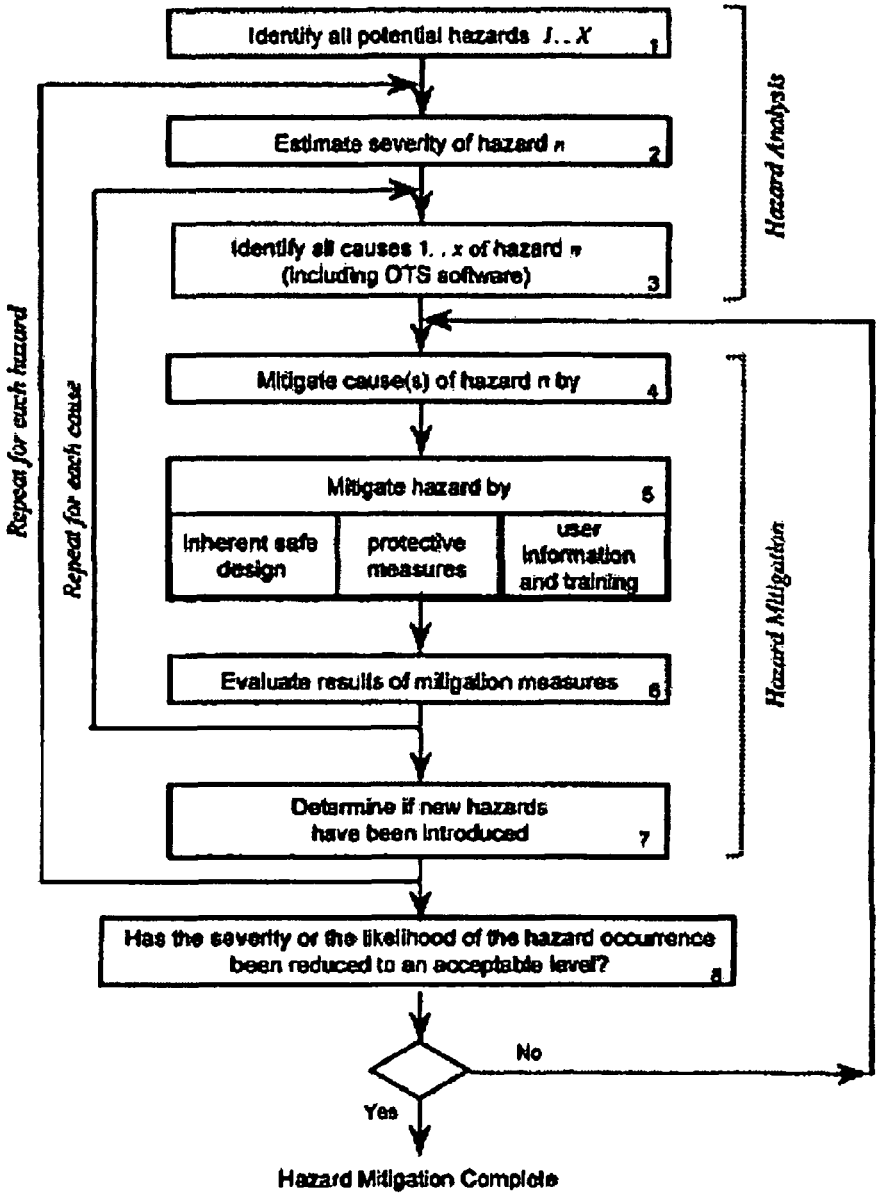

Figure 3: Schematic of Failure Analysis Method
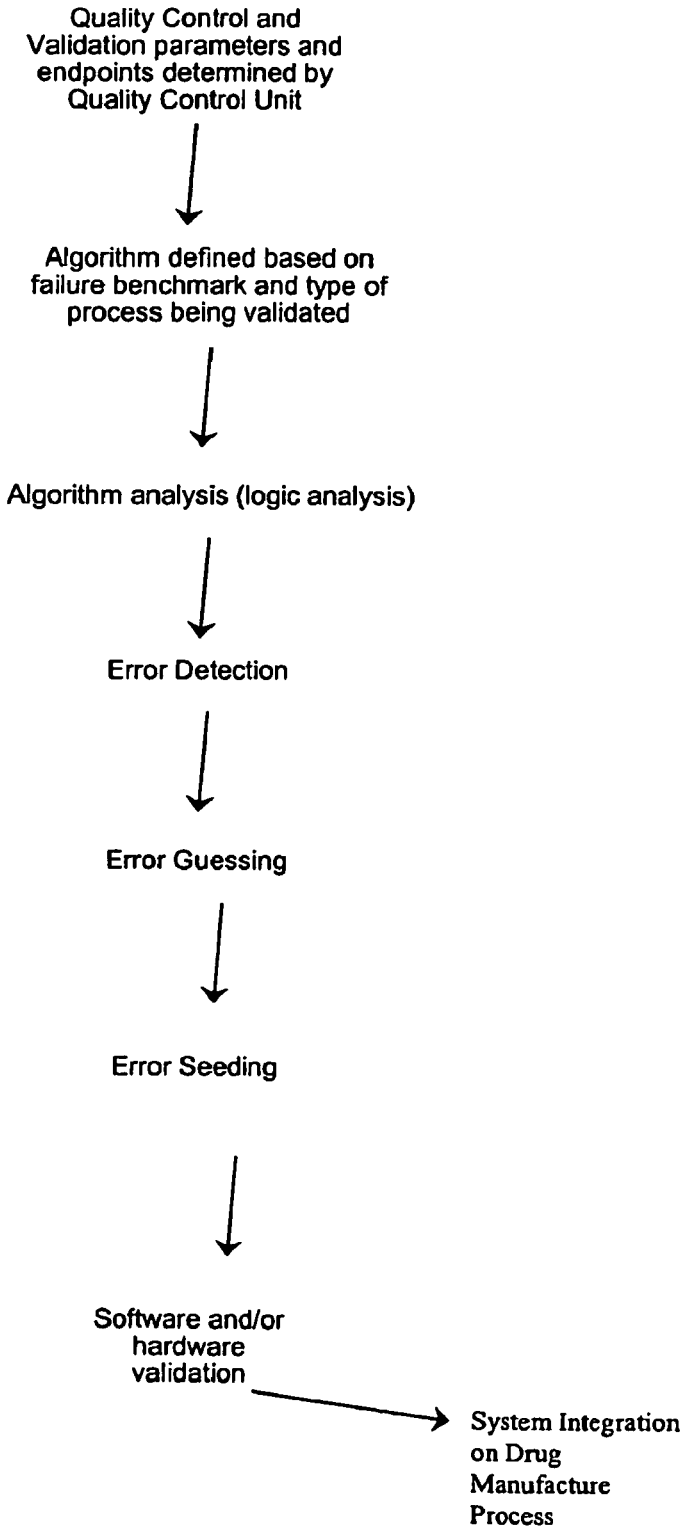

METHODS, SYSTEMS, AND SOFTWARE PROGRAM FOR VALIDATION AND MONITORING OF PHARMACEUTICAL MANUFACTURING PROCESSES

Matter enclosed in heavy brackets [ ] appears in the original patent but forms no part of this reissue specification; matter printed in italics indicates the additions made by reissue.

CROSS-REFERENCE TO RELATED APPLICATIONS

Not applicable.

STATEMENT OF RIGHTS TO INVENTIONS MADE UNDER FEDERALLY SPONSORED RESEARCH

Not applicable.

FIELD OF THE INVENTION

The invention described herein relates to methods, systems, and software program that are modified for use in software and hardware validation of pharmaceutical manufacturing processes. The invention further relates to the enhancement of quality assurance implementation protocols in current good manufacturing practice in manufacturing, processing, packing, and/or holding of drugs.

BACKGROUND OF THE INVENTION

Over the last two decades, significant changes in the environment of pharmaceutical regulation have occurred and have resulted in incremental adjustments in regulatory approaches to product quality. These changes included an increased number of pharmaceutical products and a greater role of medicines in health care, decreased frequency of manufacturing inspections as a result of fewer resources available for pharmaceutical manufacturing inspections, accumulation of experience with, "and lessons learned from", various approaches to the regulation of product quality, advances in the pharmaceutical sciences and manufacturing technologies, application of biotechnology in drug discovery and manufacturing, advances in the science and management of quality and, globalization of the pharmaceutical industry. The cumulative impact of these changes has been greater than the sum of the parts and there is an industry wide need to develop integrated approaches to monitor and assess the validation of processes and overall quality of products provided to end users and patients.

Looking ahead the most up-to-date concepts of risk management and quality systems approaches should be incorporated while continuing to ensure product quality. The latest scientific advances in pharmaceutical manufacturing and technology are encouraged. Additionally, the submission review program and the inspection program should operate in a coordinated and synergistic manner and regulation and manufacturing standards should be applied consistently. The management of validation and quality assurance programs should encourage innovation in the pharmaceutical manufacturing sector in order to provide the most effective public health protection. Resource limitations prevent uniformly intensive coverage of all pharmaceutical products and production. Significant advances in the pharmaceutical sciences and in manufacturing technologies have occurred over the last two decades. While this knowledge has been incorporated in an ongoing manner into product quality regulation, the fundamental nature of the changes dictates a thorough evaluation of the science base to ensure that product quality assurance and validation not only incorporates up-to-date science, but also encourages further advances in technology. Integrated quality systems orientation principles from various innovative approaches to manufacturing quality that have been developed in the past decade should be evaluated for applicability and current Good Manufacturing Practices requirements and related pre-approval requirements should be evaluated according to applicable principles. In addition, interaction of the pre-market Chemistry, Manufacturing, and Controls review process and the application of current Good Manufacturing Practices requirements should be evaluated as an integrated system.

With the globalization of pharmaceutical manufacturing requires a global approach to integration keeping in mind the overall objective of strong public health protection. To accomplish these needed goals there is a need to carry out the following actions. The artisan should use emerging science and data analysis to enhance validation and quality assurance programs to target the highest risk areas. From the aforementioned, the evaluation of the feasibility of establishing dedicated and integrated cadres of pharmaceutical validation and quality assurance experts should become readily apparent to one of ordinary skill in the art. Also apparent to one of ordinary skill in the art is the ability to provide a cost-efficient network of validation and quality assurance protocols. By providing an integrated and user friendly approach to validation and quality assurance the overall benefit to the public at-large is pharmaceutical end products available at lower costs. This is turn will allow more persons or animals to benefit from innovations that occur in the treatment of disease. Additionally, there is also a need to use these modalities as research tools to monitor, assess, and further the state of the art in all areas of life science treatment and studies, specifically biotechnology and pharmaceuticals.

SUMMARY OF THE INVENTION

The invention provides for a software program that validates devices used in the manufacture, processing, and storing of drugs. As used herein, the term "drug" is synonymous with "pharmaceutical". In certain embodiments, the program can be modified to conform to the programming language and operating system requirements of an individual system. In a further embodiment, the program is used to validate hardware use in drug manufacture. In another embodiment, the program is used to validate software used in drug manufacture. In another embodiment, the program is used to monitor quality assurance protocols put in place by the quality control unit.

The invention further provides methods for validating drug manufacture using the application software. In one embodiment, the method comprises installation during the concept phase of manufacturing. In another embodiment, the method comprises installation at which time the manufacture process is on-line. In another embodiment the method comprises installation during the course of quality assurance. In another embodiment, the method comprises monitoring the validation and quality assurance based on a routine maintenance schedule.

The invention further comprises a system which integrates application software and methods disclosed herein to provide a comprehensive validation and quality assurance protocol that is used by a plurality of end users whereby the data compiled from the system is analyzed and used to determine is quality assurance protocols and validation protocols are being achieved.

BRIEF DESCRIPTION OF THE FIGURES

FIG. 1. Schematic of analysis method.

FIG. 2. Flowchart of Standard Hazard Analysis and Mitigation.

FIG. 3. Schematic of failure analysis method.

DETAILED DESCRIPTION OF THE INVENTION

Outline of Sections

I.) Definitions

II.) Software Program

III.) Analysis

IV.) KITS/Articles of Manufacture

I.) Definitions:

Unless otherwise defined, all terms of art, notations and other scientific terms or terminology used herein are intended to have the meanings commonly understood by those of skill in the art to which this invention pertains unless the context clearly indicates otherwise. In some cases, terms with commonly understood meanings are defined herein for clarity and/or for ready reference, and the inclusion of such definitions herein should not necessarily be construed to represent a substantial difference over what is generally understood in the art. Many of the techniques and procedures described or referenced herein are well understood and commonly employed using conventional methodology by those skilled in the art, such as, for example, the widely utilized current Good Manufacturing Practice guidelines.

As used herein the terms "drug" and "pharmaceutical" include veterinary drugs and human drugs, including human biological drug products.

"abstraction" means the separation of the logical properties of data or function from its implementation in a computer program.

"access time" means the time interval between the instant at which a call for data is initiated and the instant at which the delivery of the data is completed.

"accuracy study processor" means a software tool used to perform calculations or determine accuracy of computer manipulated program variables.

"adaptive maintenance" means software maintenance performed to make a computer program usable in a changed environment.

"address" means a number, character, or group of characters which identifies a given device or a storage location which may contain a piece of data or a program step.

"algorithm" means any sequence of operations for performing a specific task.

"algorithm analysis" means a software verification and validation ("V&V") task to ensure that the algorithms selected are correct, appropriate, and stable, and meet all accuracy, timing, and sizing requirements.

"alphanumeric" means pertaining to a character set that contains letters, digits, and usually other characters such as punctuation marks, etc.

"analog" means pertaining to data [signals] in the form of continuously variable [wave form] physical quantities; e.g., pressure, resistance, rotation, temperature, voltage.

"analog device" means a device that operates with variables represented by continuously measured quantities such as pressures, resistances, rotations, temperatures, and voltages.

"analog-to-digital converter" means input related devices which translate an input device's [sensor] analog signals to the corresponding digital signals needed by the computer.

"analysis" means a course of reasoning showing that a certain result is a consequence of assumed premises.

"application software" means software designed to fill specific needs of a user.

"bar code" means a code representing characters by sets of parallel bars of varying thickness and separation that are read optically by transverse scanning.

"BASIC" means an acronym for Beginners All-purpose Symbolic Instruction Code, a high-level programming language intended to facilitate learning to program in an interactive environment.

"basic input/output system" means firmware that activates peripheral devices in a PC. Includes routines for the keyboard, screen, disk, parallel port and serial port, and for internal services such as time and date. It accepts requests from the device drivers in the operating system as well from application programs. It also contains autostart functions that test the system on startup and prepare the computer for operation. It loads the operating system and passes control to it.

"batch processing" means execution of programs serially with no interactive processing.

"benchmark" means a standard against which measurements or comparisons can be made.

"bias" means a measure of how closely the mean value in a series of replicate measurements approaches the true value.

"block" means a string of records, words, or characters that for technical or logical purposes are treated as a unity.

"block check" means the part of the error control procedure that is used for determining that a block of data is structured according to given rules.

"block diagram" means a diagram of a system, instrument or computer, in which the principal parts are represented by suitably annotated geometrical figures to show both the basic functions of the parts and the functional relationships between them.

"blueprint" means an detailed plan or outline.

"boot" means to initialize a computer system by clearing memory and reloading the operating system. A distinction can be made between a warm boot and a cold boot. A cold boot means starting the system from a powered-down state. A warm boot means restarting the computer while it is powered-up. Important differences between the two procedures are; 1) a power-up self-test, in which various portions of the hardware [such as memory] are tested for proper operation, is performed during a cold boot while a warm boot does not normally perform such self-tests, and 2) a warm boot does not clear all memory.

"bootstrap" means a short computer program that is permanently resident or easily loaded into a computer and whose execution brings a larger program, such an operating system or its loader, into memory.

"boundary value" means a data value that corresponds to a minimum or maximum input, internal, or output value specified for a system or component.

"boundary value analysis" means a selection technique in which test data are chosen to lie along "boundaries" of the input domain [or output range] classes, data structures, procedure parameters, etc.

"branch analysis" means a test case identification technique which produces enough test cases such that each decision has a true and a false outcome at least once.

"calibration" means ensuring continuous adequate performance of sensing, measurement, and actuating equipment with regard to specified accuracy and precision requirements.

"certification" means technical evaluation, made as part of and in support of the accreditation process, that establishes the extent to which a particular computer system or network design and implementation meet a pre-specified set of requirements.

"change control" means the processes, authorities for, and procedures to be used for all changes that are made to the computerized system and/or the system's data. Change control is a vital subset of the Quality Assurance [QA] program within an establishment and should be clearly described in the establishment's SOPs.

"check summation" means a technique for error detection to ensure that data or program files have been accurately copied or transferred.

"compiler" means computer program that translates programs expressed in a high-level language into their machine language equivalents.

"computer system audit" means an examination of the procedures used in a computer system to evaluate their effectiveness and correctness and to recommend improvements.

"computer system security" means the protection of computer hardware and software from accidental or malicious access, use, modification, destruction, or disclosure.

"concept phase" means the initial phase of a software development project, in which user needs are described and evaluated through documentation.

"configurable, off-the-shelf software" means application software, sometimes general purpose, written for a variety of industries or users in a manner that permits users to modify the program to meet their individual needs.

"control flow analysis" means a software V&V task to ensure that the proposed control flow is free of problems, such as design or code elements that are unreachable or incorrect.

"controller" means hardware that controls peripheral devices such as a disk or display screen. It performs the physical data transfers between main memory and the peripheral device.

"conversational" means pertaining to a interactive system or mode of operation in which the interaction between the user and the system resembles a human dialog.

"coroutine" means a routine that begins execution at the point at which operation was last suspended, and that is not required to return control to the program or subprogram that called it.

"corrective maintenance" means maintenance performed to correct faults in hardware or software.

"critical control point" means a function or an area in a manufacturing process or procedure, the failure of which, or loss of control over, may have an adverse affect on the quality of the finished product and may result in an unacceptable health risk.

"data analysis" means evaluation of the description and intended use of each data item in the software design to ensure the structure and intended use will not result in a hazard. Data structures are assessed for data dependencies that circumvent isolation, partitioning, data aliasing, and fault containment issues affecting safety, and the control or mitigation of hazards.

"data integrity" means the degree to which a collection of data is complete, consistent, and accurate.

"data validation" means a process used to determine if data are inaccurate, incomplete, or unreasonable. The process may include format checks, completeness checks, check key tests, reasonableness checks and limit checks.

"design level" means the design decomposition of the software item; e.g., system, subsystem, program or module.

"design phase" means the period of time in the software life cycle during which the designs for architecture, software components, interfaces, and data are created, documented, and verified to satisfy requirements.

"diagnostic" means pertaining to the detection and isolation of faults or failures.

"different software system analysis" means Analysis of the allocation of software requirements to separate computer systems to reduce integration and interface errors related to safety. Performed when more than one software system is being integrated.

"dynamic analysis" means analysis that is performed by executing the program code.

"encapsulation" means a software development technique that consists of isolating a system function or a set of data and the operations on those data within a module and providing precise specifications for the module.

"end user" means a person, device, program, or computer system that uses an information system for the purpose of data processing in information exchange.

"error detection" means techniques used to identify errors in data transfers.

"error guessing" means the selection criterion is to pick values that seem likely to cause errors.

"error seeding" means the process of intentionally adding known faults to those already in a computer program for the purpose of monitoring the rate of detection and removal, and estimating the number of faults remaining in the program.

"failure analysis" means determining the exact nature and location of a program error in order to fix the error, to identify and fix other similar errors, and to initiate corrective action to prevent future occurrences of this type of error.

"Failure Modes and Effects Analysis" means a method of reliability analysis intended to identify failures, at the basic component level, which have significant consequences affecting the system performance in the application considered.

"FORTRAN" means an acronym for FORmula TRANslator, the first widely used high-level programming language. Intended primarily for use in solving technical problems in mathematics, engineering, and science.

"life cycle methodology" means the use of any one of several structured methods to plan, design, implement, test and operate a system from its conception to the termination of its use.

"logic analysis" means evaluates the safety-critical equations, algorithms, and control logic of the software design.

"low-level language" means the advantage of assembly language is that it provides bit-level control of the processor allowing tuning of the program for optimal speed and performance. For time critical operations, assembly language may be necessary in order to generate code which executes fast enough for the required operations.

"maintenance" means activities such as adjusting, cleaning, modifying, overhauling equipment to assure performance in accordance with requirements.

"modulate" means varying the characteristics of a wave in accordance with another wave or signal, usually to make user equipment signals compatible with communication facilities.

"Pascal" means a high-level programming language designed to encourage structured programming practices.

"path analysis" means analysis of a computer program to identify all possible paths through the program, to detect incomplete paths, or to discover portions of the program that are not on any path.

"quality assurance" means the planned systematic activities necessary to ensure that a component, module, or system conforms to established technical requirements.

"quality control" means the operational techniques and procedures used to achieve quality requirements.

"software engineering" means the application of a systematic, disciplined, quantifiable approach to the development, operation, and maintenance of software.

"software engineering environment" means the hardware, software, and firmware used to perform a software engineering effort.

"software hazard analysis" means the identification of safety-critical software, the classification and estimation of potential hazards, and identification of program path analysis to identify hazardous combinations of internal and environmental program conditions.

"software reliability" means the probability that software will not cause the failure of a system for a specified time under specified conditions.

"software review" means an evaluation of software elements to ascertain discrepancies from planned results and to recommend improvement.

"software safety change analysis" means analysis of the safety-critical design elements affected directly or indirectly by the change to show the change does not create a new hazard, does not impact on a previously resolved hazard, does not make a currently existing hazard more severe, and does not adversely affect any safety-critical software design element.

"software safety code analysis" means verification that the safety-critical portions of the design are correctly implemented in the code.

"software safety design analysis" means verification that the safety-critical portion of the software design correctly implements the safety-critical requirements and introduces no new hazards.

"software safety requirements analysis" means analysis evaluating software and interface requirements to identify errors and deficiencies that could contribute to a hazard.

"software safety test analysis" means analysis demonstrating that safety requirements have been correctly implemented and that the software functions safely within its specified environment.

"system administrator" means the person that is charged with the overall administration, and operation of a computer system. The System Administrator is normally an employee or a member of the establishment.

"system analysis" means a systematic investigation of a real or planned system to determine the functions of the system and how they relate to each other and to any other system.

"system design" means a process of defining the hardware and software architecture, components, modules, interfaces, and data for a system to satisfy specified requirements.

"top-down design" means pertaining to design methodology that starts with the highest level of abstraction and proceeds through progressively lower levels.

"traceability analysis" means the tracing of Software Requirements Specifications requirements to system requirements in concept documentation.

"validation" means establishing documented evidence which provides a high degree of assurance that a specific process will consistently produce a product meeting its predetermined specifications and quality attributes.

"validation, process" means establishing documented evidence which provides a high degree of assurance that a specific process will consistently produce a product meeting its predetermined specifications and quality characteristics.

"validation, prospective" means validation conducted prior to the distribution of either a new product, or product made under a revised manufacturing process, where the revisions may affect the product's characteristics.

"validation protocol" means a written plan stating how validation will be conducted, including test parameters, product characteristics, production equipment, and decision points on what constitutes acceptable test results.

"validation, retrospective" means validation of a process for a product already in distribution based upon accumulated production, testing and control data. Retrospective validation can also be useful to augment initial premarket prospective validation for new products or changed processes. Test data is useful only if the methods and results are adequately specific. Whenever test data are used to demonstrate conformance to specifications, it is important that the test methodology be qualified to assure that the test results are objective and accurate.

"validation, software" means, determination of the correctness of the final program or software produced from a development project with respect to the user needs and requirements. Validation is usually accomplished by verifying each stage of the software development life cycle.

"structured query language" means a language used to interrogate and process data in a relational database. Originally developed for IBM mainframes, there have been many implementations created for mini and micro computer database applications. SQL commands can be used to interactively work with a data base or can be embedded with a programming language to interface with a database.

"Batch" means a specific quantity of a drug or other material that is intended to have uniform character and quality, within specified limits, and is produced according to a single manufacturing order during the same cycle of manufacture.

"Component" means any ingredient intended for use in the manufacture of a drug product, including those that may not appear in such drug product.

"Drug product" means a finished dosage form, for example, tablet, capsule, solution, etc., that contains an active drug ingredient generally, but not necessarily, in association with inactive ingredients. The term also includes a finished dosage form that does not contain an active ingredient but is intended to be used as a placebo.

"Active ingredient" means any component that is intended to furnish pharmacological activity or other direct effect in the diagnosis, cure, mitigation, treatment, or prevention of disease, or to affect the structure or any function of the body of man or other animals. The term includes those components that may undergo chemical change in the manufacture of the drug product and be present in the drug product in a modified form intended to furnish the specified activity or effect.

"Inactive ingredient" means any component other than an active ingredient.

"In-process material" means any material fabricated, compounded, blended, or derived by chemical reaction that is produced for, and used in, the preparation of the drug product.

"Lot number, control number, or batch number" means any distinctive combination of letters, numbers, or symbols, or any combination thereof, from which the complete history of the manufacture, processing, packing, holding, and distribution of a batch or lot of drug product or other material can be determined.

"Quality control unit" means any person or organizational element designated by the firm to be responsible for the duties relating to quality control.

"Acceptance criteria" means the product specifications and acceptance/rejection criteria, such as acceptable quality level and unacceptable quality level, with an associated sampling plan, that are necessary for making a decision to accept or reject a lot or batch.

II.) Software Program (Computer Product)

The invention provides for a software program that is programmed in a high-level or low-level programming language, preferably a relational language such as structured query language which allows the program to interface with an already existing program or a database. Preferably, however, the program will be initiated in parallel with the manufacturing process or quality assurance ("QA") protocol. This will allow the ability to monitor the manufacturing and QA process from its inception. However, in some instances the program can be bootstrapped into an already existing program that will allow monitoring from the time of execution (i.e. bootstrapped to configurable off-the-shelf software).

It will be readily apparent to one of skill in the art that the preferred embodiment will be a software program that can be easily modified to conform to numerous software-engineering environments. One of ordinary skill in the art will understand and will be enabled to utilize the advantages of the invention by designing the system with top-down design. The level of abstraction necessary to achieve the desired result will be a direct function of the level of complexity of the process that is being monitored. For example, the critical control point for monitoring an active ingredient versus an inactive ingredient may not be equivalent. Similarly, the critical control point for monitoring an in-process material may vary from component to component and often from batch to batch.

One of ordinary skill will appreciate that to maximize results the ability to amend the algorithm needed to conform to the validation and QA standards set forth by the quality control unit on each step during manufacture will be preferred. This differential approach to programming will provide the greatest level of data analysis leading to the highest standard of data integrity.

The preferred embodiments may be implemented as a method, system, or program using standard software programming and/or engineering techniques to produce software, firmware, hardware, or any combination thereof. The term "computer product" as used herein is intended to encompass one or more computer programs and data files accessible from one or more computer-readable devices, firmware, programmable logic, memory devices (e.g. EEPROM's, ROM's, PROM's, RAM's, SRAM's, etc.) hardware, electronic devices, a readable storage diskette, CD-ROM, a file server providing access to programs via a network transmission line, wireless transmission media, signals propagating through space, radio waves, infrared signals, etc. Those of skill in the art will recognize that many modifications may be made without departing from the scope of the present invention.

III.) Analysis

The invention provides for a method of analyzing data that is compiled as a result of the manufacturing of pharmaceuticals. Further the invention provides for the analysis of data that is compiled as a result of a QA program used to monitor the manufacture of drugs in order to maintain the highest level of data integrity. In one embodiment, the parameters of the data will be defined by the quality control unit. Generally, the quality control unit will provide endpoints that need to be achieved to conform to current Good Manufacturing Practices regulations or in some instances an internal endpoint that is more restrictive to the minimum levels that need to be achieved.

In a preferred embodiment, the invention provides for data analysis using boundary value analysis. The boundary value will be set forth by the quality control unit. Using the boundary values set forth for a particular phase of manufacture the algorithm is defined. Once the algorithm is defined, an algorithm analysis (i.e. logic analysis) takes place. One of skill in the art will appreciate that a wide variety of tools are used to confirm algorithm analysis such as an accuracy study processor.

One of ordinary skill will appreciate that different types of data will require different types of analysis. In a further embodiment, the program provides a method of analyzing block data via a block check. If the block check renders an affirmative analysis, the benchmark has been met and the analysis continues to the next component. If the block check renders a negative the data is flagged via standard recognition files known in the art and a hazard analysis and hazard mitigation occurs.

In a further embodiment, the invention provides for data analysis using branch analysis. The test cases will be set forth by the quality control unit.

In a further embodiment, the invention provides for data analysis using control flow analysis. The control flow analysis will calibrate the design level set forth by the quality control unit which is generated in the design phase.

In a further embodiment, the invention provides for data analysis using failure analysis. The failure analysis is initiated using the failure benchmark set forth by the quality control unit and then using standard techniques to come to error detection. The preferred technique will be top-down. For example, error guessing based on quality control group parameters which are confirmed by error seeding.

In a further embodiment, the invention provides for data analysis using path analysis. The path analysis will be initiated after the design phase and will be used to confirm the design level. On of ordinary skill in the art will appreciate that the path analysis will be a dynamic analysis depending on the complexity of the program modification. For example, the path analysis on the output of an end product will be inherently more complex that the path analysis for the validation of an in-process material. However, one of ordinary skill will understand that the analysis is the same, but the parameters set forth by the quality control unit will differ.

The invention provides for a top-down design to software analysis. This preferred embodiment is advantageous because the parameters of analysis will be fixed for any given process and will be set forth by the quality control unit. Thus, performing software safety code analysis then software safety design analysis, then software safety requirements analysis, and then software safety test analysis will be preferred.

The aforementioned analysis methods are used for several non-limiting embodiments, including but not limited to, validating QA software, validating pharmaceutical manufacturing, and validating process designs wherein the integration of the system design will allow for more efficient determination of acceptance criteria in a batch, in-process material, batch number, control number, and lot number and allow for increased access time thus achieving a more efficient cost-saving manufacturing process.

IV.) Kits/Articles of Manufacture

For use in basic input/output systems, hardware calibrations, software calibrations, computer systems audits, computer system security certification, data validation, different software system analysis, quality control, and the manufacturing of drug products described herein, kits are within the scope of the invention. Such kits can comprise a carrier, package, or container that is compartmentalized to receive one or more containers such as boxes, shrink wrap, and the like, each of the container(s) comprising one of the separate elements to be used in the method, along with a program or insert comprising instructions for use, such as a use described herein.

The kit of the invention will typically comprise the container described above and one or more other containers associated therewith that comprise materials desirable from a commercial and user standpoint, programs listing contents and/or instructions for use, and package inserts with instructions for use.

A program can be present on or with the container. Directions and or other information can also be included on an insert(s) or program(s) which is included with or on the kit. The program can be on or associated with the container.

The terms "kit" and "article of manufacture" can be used as synonyms.

The article of manufacture typically comprises at least one container and at least one program. The containers can be formed from a variety of materials such as glass, metal or plastic.

EXAMPLES

Various aspects of the invention are further described and illustrated by way of the several examples that follow, none of which is intended to limit the scope of the invention.

Example 1

Implementation in Clinical Manufacturing Process

In one embodiment, the invention comprises the validation and quality control of drug products manufactured during the clinical phase of development. Generally, A phase I human clinical trial is initiated to assess the safety of doses of a drug product candidate in connection with the treatment of a disease. In the study, the safety of single doses when utilized as therapy is assessed. The trial design includes delivery of single doses of a drug product candidate escalating from approximately about 25 mg/m$^2$ to about 275 mg/m$^2$ over the course of the treatment in accordance with a pre-defined schedule (i.e. parameters defined by quality control unit).

Patients are closely followed for one-week following each administration of the drug product candidate. In particular, patients are assessed for safety concerns (i.e. toxicity, fever, shaking, chills, the development of an immunogenic response to the material.) Standard tests and follow-up are utilized to monitor each of these safety concerns. Patients are also assessed for clinical outcome and particularly treatment of the disease being evaluated.

The drug product candidate is demonstrated to be safe and efficacious, Phase II trials confirm the efficacy and refine optimum dosing.

The drug product candidate is safe in connection with the above-discussed trial, a Phase II human clinical trial confirms the efficacy and optimum dosing for monotherapy. Such trial is accomplished, and entails the same safety and outcome analyses, to the above-described trial with the exception being that patients do not receive other forms of treatment concurrently with the receipt of doses of the drug product candidate.

Once again, as the therapy discussed above is safe within the safety criteria discussed above, a Phase III human clinical trial is initiated.

As previously set forth, the acceptance criteria of all components used in the drug product manufacture for the purposes of the clinical trial are determined by the quality control unit. The analysis of the software and hardware occurs using any of the methods disclosed herein. (See for example FIG. 1 and FIG. 3). The program monitors and processes the data and stores the data using standard methods. The data is provided to an end user or a plurality of end users for assessing the quality of the batch. Furthermore, the data is stored for comparative analysis to previous batches to provide a risk-based assessment in case of failure. Using the historical analysis will provide a more streamlined manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 2

Implementation in Post-Clinical Commercial Manufacturing Process

Provided the drug product candidate has been awarded regulatory approval and is manufactured for commercial use. The invention comprises a method for monitoring the acceptance criteria of all components used in the drug product manufacture. The analysis of the software and hardware occurs using any of the methods disclosed herein. (See for example FIG. 1 and FIG. 3). The program monitors and processes the data and stores the data using methods known in the art. The data is provided to an end user or a plurality of end users for assessing the quality of the batch. Furthermore, the data is stored for comparative analysis to previous batches to provide a risk-based assessment in case of failure. Using the historical analysis will provide a more streamlined manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 3

Integration of Program into Manufacturing Hardware System

The invention comprises the integration of the computer product into a manufacturing hardware system. In this context, the term "hardware" means any physical device used in the pharmaceutical manufacturing process including, but not limited to, blenders, bio-reactors, capping machines, chromatography/separation systems, chilled water/circulating, glycol, coldrooms, clean steam, clean-in-place (CIP), compressed air, D.I./R.O. watersystems, dry heat sterilizers/ovens, fermentation equipment/bio reactors, freezers, filling equipment, filtration/purification, HVAC: environmental controls, incubators/environmentally controlled chambers, labelers, lyophilizers/freeze, dryers, mixing tanks, modular cleanrooms, neutralization systems, plant steam and condensate, process tanks/pressure, vessels, refrigerators, separation/purification equipment, specialty gas, systems, steam generators/pure steam systems, steam sterilizers, stopper washers, solvent recovery systems, tower water systems, waste inactivation systems/"kill" systems, vial inspection systems, vial washers, water for injection (WFI) systems, pure water systems, washers (glass, tank, carboys, etc.).

It will be understood by one of skill in the art that the computer product integrates the hardware via generally understood devices in the art (i.e. attached to the analog device via an analog to digital converter).

The computer product is integrated into the manufacturing system on a device by device basis. As previously set forth, the acceptance criteria of all devices used in the drug product manufacture for the purposes of the manufacturing process are determined by the quality control unit. The analysis of the software and hardware occurs using any of the methods disclosed herein. (See for example FIG. 1 and FIG. 3). The program monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 4

Integration of Program into Manufacturing Software System

The invention comprises the integration of the computer product into a manufacturing software system. In this context, the term "software" means any device used in the pharmaceutical manufacturing process including, but not limited to user-independent audit trails, time-stamped audit trails, data security, confidentiality systems, limited authorized system access, electronic signatures, bar codes, dedicated systems, add-on systems, control files, Internet, LAN's, etc.

The computer product is integrated into the manufacturing system on a device-by-device basis. As previously set forth, the acceptance criteria of all devices used in the drug product manufacture for the purposes of the manufacturing process to are determined by the quality control unit. The analysis of the software and hardware occurs using any of the methods disclosed herein. (See for example FIG. 1 and FIG. 3). The program monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 5

Integration of Program into Quality Assurance System

The invention comprises the integration of the computer product into a quality assurance system. In this context, the term "quality assurance" means the planned systematic activities necessary to ensure that a component, module, or system conforms to established technical requirements. A quality assurance system will compliment either of the systems set for in the examples entitled "Integration of program into manufacturing hardware system" or "Integration of program into manufacturing software system" to ensure data integrity and reliability from the data that is generated set forth in either of the examples entitled "Implementation in Clinical Manufacturing Process" or "Implementation in Post-Clinical Commercial Manufacturing Process".

The computer product is integrated into the manufacturing system on a device-by-device basis. As previously set forth, the acceptance criteria of all devices used in the drug product manufacture for the purposes of the manufacturing process are determined by the quality control unit. The analysis of the software and hardware occurs using any of the methods disclosed herein. (See for example FIG. 1 and FIG. 3). The program monitors and processes the data and stores the data using standard methods. The data is provided to an end user or a plurality of end users for assessing the quality of data generated by the device. Furthermore, the data is stored for comparative analysis to previous batches to provide a risk-based assessment in case of failure. Using the historical analysis will provide a more streamlined manufacturing approach and will provide cost-saving over time. In addition, the invention comprises monitoring the data from initial process, monitoring the data at the end process, and monitoring the data from a routine maintenance schedule to ensure the system maintain data integrity and validation standard predetermined by the quality control unit.

Example 6

Integration of Program and Methods into a Comprehensive Cost-Saving System

The invention comprises a program and method integrated into a comprehensive cost-saving pharmaceutical manufacturing system. A user, preferably a system administrator, logs onto the system via secure means (i.e. password or other security measures known in the art) and inputs the boundary values for a particular component of the drug manufacturing process. The input is at the initial stage, the end product state, or any predetermined interval in between that has been established for routine maintenance by the quality control unit. The data is generated using any one of the various analysis methods described herein (as previously stated the type of analysis used is functional to the device or protocol being monitored or evaluated). Subsequent to the data analysis, any modifications or corrective action to the manufacturing process is implemented. The data is then stored by standard methods known in the art. Scheduled analysis of the stored data is maintained to provide a preventative maintenance of the manufacturing process. Over time, costs are reduced due to the tracking of data and analysis of troubled areas and frequency of hazards that occur on any given device in the manufacturing process. The system is implemented on every device which plays a role in drug manufacturing. The data compiled from every device is analyzed using the methods described herein.

The present invention is not to be limited in scope by the embodiments disclosed herein, which are intended as single illustrations of individual aspects of the invention, and any that are functionally equivalent are within the scope of the invention. Various modifications to the models and methods of the invention, in addition to those described herein, will become apparent to those skilled in the art from the foregoing description and teachings, and are similarly intended to fall within the scope of the invention. Such modifications or other embodiments can be practiced without departing from the true scope and spirit of the invention.

The invention claimed is:

1. A method for monitoring a pharmaceutical manufacturing process *using at least a dry heat sterilizer*, said method comprising:

a) deriving an algorithm implemented in computer executable instructions that performs data analysis on said pharmaceutical manufacturing process *using at least a dry heat sterilizer*;

b) performing "logic analysis" on said algorithm;

c) performing "software safety code analysis" on said algorithm;

d) performing "software safety design analysis" on said algorithm;

e) performing "software safety requirements analysis" on said algorithm;

f) performing "software safety test analysis" on said algorithm;

g) integrating the said algorithm into a pharmaceutical manufacturing process whereby actual monitoring of the manufacturing process is attained.

2. The method of claim 1, wherein the ["]data analysis["] is selected from the group consisting of "boundary value analysis", "block check", "branch analysis", "control flow analysis", "failure analysis", and "path analysis".

3. The method of claim 1, wherein the pharmaceutical manufacturing occurs in a clinical manufacturing process.

4. The method of claim 1, wherein the pharmaceutical manufacturing occurs in a post-clinical commercial manufacturing process.

5. A computer memory having computer executable instructions to perform the method according to claim 1.

6. A kit comprising the computer memory having computer executable instructions of claim 5.

* * * * *